Nov. 26, 1940.　　　H. B. DONLEY　　　2,223,059
DIRECTION SIGNAL
Filed March 31, 1939
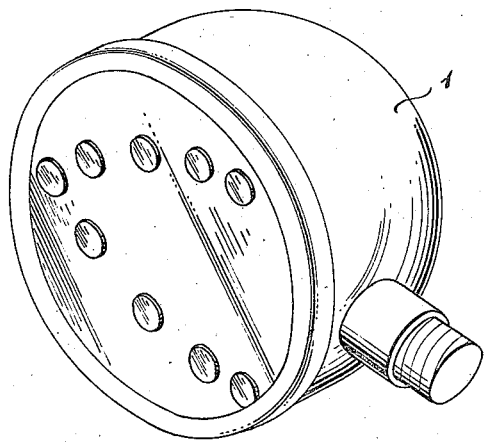
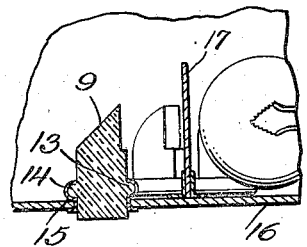
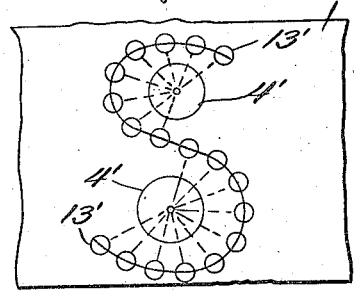
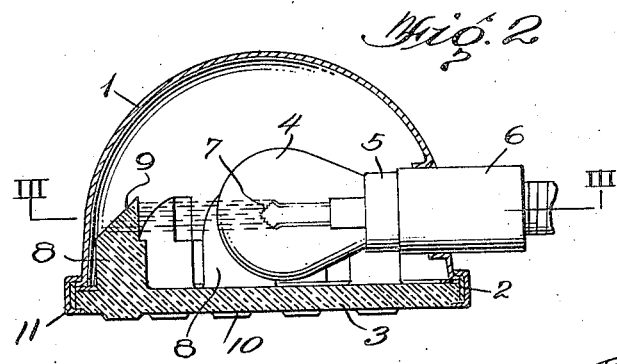
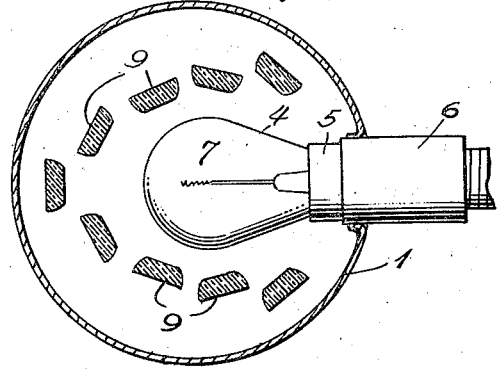
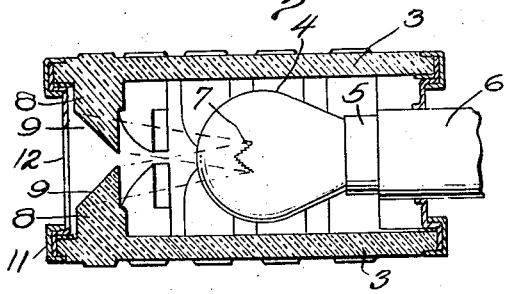
Inventor
Harold B. Donley
W. S. McDowell
Attorney Patented Nov. 26, 1940

2,223,059

UNITED STATES PATENT OFFICE 2,223,059

DIRECTION SIGNAL

Harold B. Donley, Columbus, Ohio, assignor to Columbus Metal Products, Inc., Columbus, Ohio Application March 31, 1939, Serial No. 265,371

4 Claims. (Cl. 40—132)

This invention relates to an illuminated sign construction and has particular reference to an improved light transmitting cover, panel or lens for use in connection with such signs.

Many electrically illuminated signs of the type involving indicia containing panels or lenses are ineffective or inefficient during periods of daylight. This is often due to the fact that the sources of light employed in such signs lack sufficient candle power strength, particularly when the light is distributed uniformly over the full area of the panels or lenses, to produce requisite visual contrast for well defined discernment between the indicia and background therefor. While this condition is true of many illuminated signs employed for divers purposes, it is especially true of illuminated sign devices of the type used in connection with motor vehicles, such as those utilized for indicating stops or right and left hand turns. Many of such signs are quite effective when the vehicles are operated during periods of darkness but are totally inadequate during daylight periods to project light through required distances to render such signs effective as signalling or intelligence transmitting means. When an attempt is made to increase the candle power of the light sources of such signalling lamps to render them adequate for daytime operation, the augmented strength of the light source results in producing glare or a too brilliant illumination for night operation.

It is an object of the present invention, therefore, to provide an illuminated sign having a light-transmitting lens or panel having an informative design or other indicia displayed thereon, and wherein provision is made for concentrating the light rays issuing from a light source on localized portions of the lens or panel constituting such design or indicia, so that with a light source of comparatively normal candle power, desired and intense illumination of localized portions of the light-transmitting panel is obtainable, to the end of rendering the panel and the information contained thereon clearly discernible during both day and night operation.

It is also an object of the invention to provide an illuminated signal having a lens or panel with which is formed or associated a plurality of prisms of a novel light reflecting character, the said prisms being formed and disposed in registration with a light source concealed within the signal so that light issuing from said source will be reflected in desired directions through the panel by means of said prisms for the purpose of effecting intense illumination of restricted portions of the lens or panel, whereby to provide the signal containing indicia which may be unmistakably viewed and understood during day and night periods.

Other objects will be apparent from the following description and the accompanying drawing in which the invention has been illustrated in several of its preferred forms.

In the drawing:

Fig. 1 is a perspective view of a lamp formed in accordance with the present invention;

Fig. 2 is a horizontal sectional view taken through the lamp shown in Fig. 1;

Fig. 3 is a detail vertical sectional view taken on the plane indicated by the line III—III of Fig. 2;

Fig. 4 is a horizontal sectional view taken through a modified form of lamp;

Fig. 5 is a detail sectional view of a modified form of lamp;

Fig. 6 is a detail front elevational view of a further modified form of the present invention.

While the present invention is directed to illuminated signs broadly, its features are particularly useful in connection with motor vehicle signalling lamps. In the above described figures of the drawing, my invention has been illustrated as embodied in such a signalling lamp. However, it will be understood that the principles of the present invention are applicable to illuminated signs generally, and therefore the use of the invention in motor vehicle lamps is illustrative of but one embodiment of the invention and is not to be construed in a limiting sense.

Referring more particularly to the drawing, the numeral 1 designates the casing of the signal lamp. This casing is cup-shaped and has a closed rear portion and an open front end. The open end of the casing is formed with an offset flange 2 to receive a circular lens 3 employed in closing the end of the casing. Within the casing is an incandescent lamp 4 having its base 5 in a socket 6 carried by the casing wall. The lamp 4 is so disposed that the filament 7 is in the center of the casing and the light issuing therefrom will be directed on a plurality of prisms 8 spaced around the lamp.

In the form of the invention illustrated, the prisms are so positioned on or contiguous to the lens as to provide a modified arrowhead symbol or design. These prisms, in one form of my invention, are molded integrally with the lens and, generally, are cylindrical in shape. As shown, the prisms project at right angles from the plane of the lens into the interior of the casing. Each prism has its inner end cut at an angle of substantially 45 degrees to the longitudinal axis of the prism body to provide a reflecting surface, the latter being disposed in substantial registration with the filament of the bulb or other light source. The side of each prism facing toward the bulb or light source is flattened to present a surface arranged at right angles to the path of light issuing from the bulb so that the light will pass into the prism and not be refracted by a curved surface. After the light rays enter the prisms, they strike the planar reflecting surfaces 9 at an acute angle and, therefore, will be redirected longitudinally of the prisms and pass outwardly through the lens.

The outer surface of the lens is provided in registration with each prism with an integral raised pad 10, and, also, the outer surface of the lens is coated with enamel to prevent the light from issuing therethrough except at the raised pads. A lens ring 11 is employed to secure the lens 3 with the lamp casing.

By the construction described, a lamp has been provided which will direct a plurality of beams of concentrated light toward any objective. Due to the fact that a plurality of beams are employed, the light will not produce a glare after dark and will be clearly visible by day because of the high concentration produced by the prismatic construction.

In the form of the invention shown in Fig. 4, a lamp has been provided which will direct the beams of light toward the front and rear of the vehicle. This lamp includes a casing 12 which is open at the front and rear. The incandescent lamp 4 is positioned in spaced relation from the open ends and a pair of lenses, similar to the lens employed in the first form of the invention, are secured to the open ends of the casing. The reflecting surfaces of the prisms are not exactly in registration with the filament of the bulb but the light directed thereon will be reflected in the desired direction since the angle of projection is less than 45 degrees to the reflecting surface.

In the modified form shown in Fig. 5, the prisms are separate from the plate closing the open end of the lamp casing. The prisms 13 are cylindrical in form and have a bead 14 intermediately of their ends which is engaged by a sleeve 15. The body of the cover plate 16 is made of metal and has an opening to receive the sleeve 15. By this arrangement, the prisms are supported with the plate and the reflecting surfaces are disposed in registration with the light source.

While the prisms have been described as being formed of glass, any transparent plastic may be used. It is desirable to tint the glass to give the light rays issuing from the prisms a suitable color which will be attention attracting. In some instances, the addition of coloring material to the glass may detract from the light transmitting properties in which case it may be found desirable to position a colored screen between the light source and the prisms as indicated at 17 in Fig. 5.

As shown in Fig. 6, an illuminated sign is provided for general outdoor service. Such a sign may comprise an outer panel 20 having positioned therein a plurality of prisms 13', corresponding to the construction and mounting of the prisms 13, disclosed in Fig. 5. In the form of the invention disclosed in Fig. 6, the prisms 13' are arranged in the conventional order of the letter S and these prisms may be illuminated by the provision of a pair of incandescent lamps 4', the latter being so disposed as to effect the required illumination of the prisms 13', so that when the sign is extraneously viewed, the letter or other indicia formed by the prisms 13' may be clearly viewed and identified.

It is obvious that the prisms may be arranged in any configuration. For example, they may be arranged to produce words or objects and it is desired to reserve the rights to any of the modified forms that may be said to fall within the scope of the appended claims.

I claim:

1. In a signal, a glass-like lens, a plurality of cylindrical projections provided on the rear surface of said lens, said projections being grouped in predetermined order, said projections having flat end surfaces disposed at an angle of substantially 45 degrees with respect to the longitudinal axes of said projections, the sides of said projections opposite said angular ends being flat and disposed at right angles to lines passing through a single point surrounded by said group of projections, and a plurality of raised pads provided on the front surface of said lens, each pad being in registration with a projection on the opposite surface of said lens.

2. In a signal, a glass-like lens, a plurality of cylindrical projections provided on the rear surface of said lens, said projections being grouped in predetermined order, said projections having flat end surfaces disposed at an angle of substantially 45 degrees with respect to the longitudinal axes of said projections, the sides of said projections opposite said angular ends being flat and disposed at right angles to lines passing through a single point surrounded by said group of projections, a plurality of raised pads provided on the front surface of said lens, each pad being in registration with a projection on the opposite surface of said lens, and an opaque coating provided on the front surface of said lens, the coating being omitted from the outer surfaces of said pads.

3. In a signal, a glass-like lens, a plurality of prism members integrally formed with said lens and projecting from one surface thereof, said prisms having flat end surfaces disposed at an angle of substantially 45 degrees with respect to the surface of said lens and being grouped in predetermined order to reflect light rays emanating from a common point longitudinally through said prisms, and an opaque coating on one surface of said lens, said coating being omitted in predetermined regions to provide transparent areas in registration with said prisms.

4. In a signal, a glass-like lens, a plurality of prism members integrally formed with said lens and projecting from one surface thereof, said prisms having flat end surfaces disposed at an angle of substantially 45 degrees with respect to the surface of said lens and being grouped in predetermined order to reflect light rays emanating from a common point longitudinally through said prisms, and substantially opaque means covering one surface of said lens, said means being omitted in predetermined regions to provide transparent areas in registration with said prisms.

HAROLD B. DONLEY.